US011815274B2

(12) United States Patent
Alsberg et al.

(10) Patent No.: US 11,815,274 B2
(45) Date of Patent: Nov. 14, 2023

(54) LINE VOLTAGE POWERED THERMOSTAT WITH WIRELESS COMMUNICATION

(71) Applicant: Warmboard, Inc., Aptos, CA (US)

(72) Inventors: Terry Wayne Alsberg, Capitola, CA (US); David Diepersloot, Scotts Valley, CA (US); Brian Alsberg, Santa Cruz, CA (US)

(73) Assignee: Warmboard, Inc., Aptos, CA (US)

( * ) Notice: Subject to any disclaimer, the term of this patent is extended or adjusted under 35 U.S.C. 154(b) by 797 days.

(21) Appl. No.: 16/789,179

(22) Filed: Feb. 12, 2020

(65) Prior Publication Data

US 2020/0263898 A1 Aug. 20, 2020

Related U.S. Application Data

(60) Provisional application No. 62/806,393, filed on Feb. 15, 2019.

(51) Int. Cl.
*F24F 11/523* (2018.01)
*F24F 11/88* (2018.01)
(Continued)

(52) U.S. Cl.
CPC ............ *F24F 11/523* (2018.01); *F24F 11/30* (2018.01); *F24F 11/56* (2018.01); *F24F 11/63* (2018.01);
(Continued)

(58) Field of Classification Search
CPC .......... F24F 11/30; F24F 11/523; F24F 11/56; F24F 11/63; F24F 11/70; F24F 11/88; F24F 2110/12; G05D 23/1917
See application file for complete search history.

(56) References Cited

U.S. PATENT DOCUMENTS

| 4,433,718 A | 2/1984 | Bresin |
| 7,339,466 B2 | 3/2008 | Mansfield et al. |

(Continued)

FOREIGN PATENT DOCUMENTS

| GB | 2533646 A | 6/2016 |
| WO | WO 2013/155530 A1 | 10/2013 |

OTHER PUBLICATIONS

PCT International Search Report and Written Opinion, PCT Application No. PCT/US20/18141, dated Apr. 28, 2020, 12 pages.

(Continued)

*Primary Examiner* — Joseph F Trpisovsky
(74) *Attorney, Agent, or Firm* — Fenwick & West LLP

(57) ABSTRACT

A thermostat assembly powered by line voltage and capable of wireless communication with a heat source, comprising a first portion and a second portion separated by a barrier. The first portion receives power via internal housing wiring at a first high voltage level and converts the power from the first high voltage level to a second low voltage level. The second portion is removably connected to the first portions to receive power at the second low voltage level, which powers at least a temperature sensor that measures an ambient temperature of an outside environment and a communication chip for wireless communication with a primary heat source. The barrier inhibits dissipation of heat between the first and second portions to reduce an effect of a temperature of the first portion on the temperature sensor, and prevents a user from contacting any high voltage components when the second portion is removed.

9 Claims, 6 Drawing Sheets

(51) Int. Cl.
  *F24F 11/56* (2018.01)
  *F24F 11/30* (2018.01)
  *F24F 11/63* (2018.01)
  *G05D 23/19* (2006.01)
  *F24F 11/70* (2018.01)
  *F24F 110/12* (2018.01)

(52) U.S. Cl.
  CPC .............. *F24F 11/70* (2018.01); *F24F 11/88* (2018.01); *G05D 23/1917* (2013.01); *F24F 2110/12* (2018.01)

(56) References Cited

U.S. PATENT DOCUMENTS

2013/0268124 A1   10/2013   Matsuoka et al.
2016/0327301 A1*  11/2016   Ribbich ................. H05B 47/11
2017/0059190 A1    3/2017   Stefanski et al.
2017/0060150 A1    3/2017   Stefanski et al.

OTHER PUBLICATIONS

European Patent Office, (Extended) European Search Report and Opinion, European Patent Application No. 20756253.9, dated Sep. 9, 2022, 12 pages.

* cited by examiner

LINE VOLTAGE POWERED THERMOSTAT WITH WIRELESS COMMUNICATION

CROSS-REFERENCE TO RELATED APPLICATIONS

This application claims the benefit of U.S. Provisional Patent Application No. 62/806,393, filed on Feb. 15, 2019, which is hereby incorporated by reference in its entirety.

BACKGROUND

The present disclosure generally relates to thermostat systems, and specifically relates to line powered thermostat systems with wireless communication.

Many houses have heating and/or cooling systems used to regulate the temperature within the house. In order to control the heating or cooling system, a house will typically have at least one thermostat configured to sense an interior temperature of the house and to instruct the heating/cooling system accordingly. In some cases, a house or building may have multiple thermostats corresponding to different rooms or zones.

Many thermostats are configured to run on a voltage that is lower than the general wiring throughout the house (e.g., ~110-120 volts AC). As such, these thermostats are often powered by battery or by separate wiring (e.g., 24 V wires) routed throughout the building. This can be inconvenient as batteries require regular switching by the user, while 24V wiring will need to be specially wound through the building, which may be time-consuming and labor intensive, especially in systems with multiple thermostats.

SUMMARY

Embodiments relate to a thermostat assembly powered by line voltage and capable of wireless communication with a heat source. In some embodiments, the thermostat assembly comprises a first portion and a second portion separated by a barrier. The first portion comprises a power circuit configured to receive power via internal housing wiring at a first voltage level, the first voltage level being a high voltage, a power conversion circuit configured to convert the power received at the first voltage level into power at a second voltage level lower than the first voltage level and being a low voltage, and a first connector. The second portion comprises a second connector configured to removably connect to the first connector and receive power from the first portion at the second voltage level, and one or more electronic components powered by the received power at the second voltage level, including at least a temperature sensor configured to measure an ambient temperature of an outside environment, and a communication chip configured to communicate wirelessly with a primary heat source. The barrier separating the first and second components is configured to inhibit dissipation of heat from the first portion to the second portion to reduce an effect of a temperature of the first portion on the temperature sensor, and to prevent a user from contacting any components that receive power at the first voltage level when the second portion is removed from the first portion.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments relate to a thermostat powered by line voltage and configured to communicate wirelessly with a heat source. Due to being powered by line voltage, the thermostat can be connected to the existing wiring within a house or building, making the thermostat easier to install. The thermostat has separate high voltage and low voltage portions. The high voltage portion converts line voltage power provided through the house wiring to lower voltage power usable by the electronic components of the low voltage portion. The high and low voltage portions are separated by a barrier that provides thermodynamic insulation between the two portions, preventing heat generated by the power conversion circuitry of the high voltage portion from adversely affecting the components of the low voltage portion. In addition, the separation of the high and low voltage portions allows for the low voltage portion to be switched out or removed without having the user exposed to high voltage (e.g., for repair or upgrade).

In contrast, many current thermostats are powered by battery (which require periodic switching) or require special lower voltage wiring (e.g., 24 V wiring) to be wound through the house, which can significantly raise installation costs for the thermostat. In some cases, a thermostat may be part of a resistive electric heating system that provides heating by converting the high voltage power provided by the line voltage wiring into heat using one or more resistive heating elements (e.g., heating coils). The thermostat is implemented as a switch of the resistive electric heating system to control whether power is provided to the resistive heating elements. As such, such thermostats typically must be physically connected to the heating system.

Overall System

Figure 1:
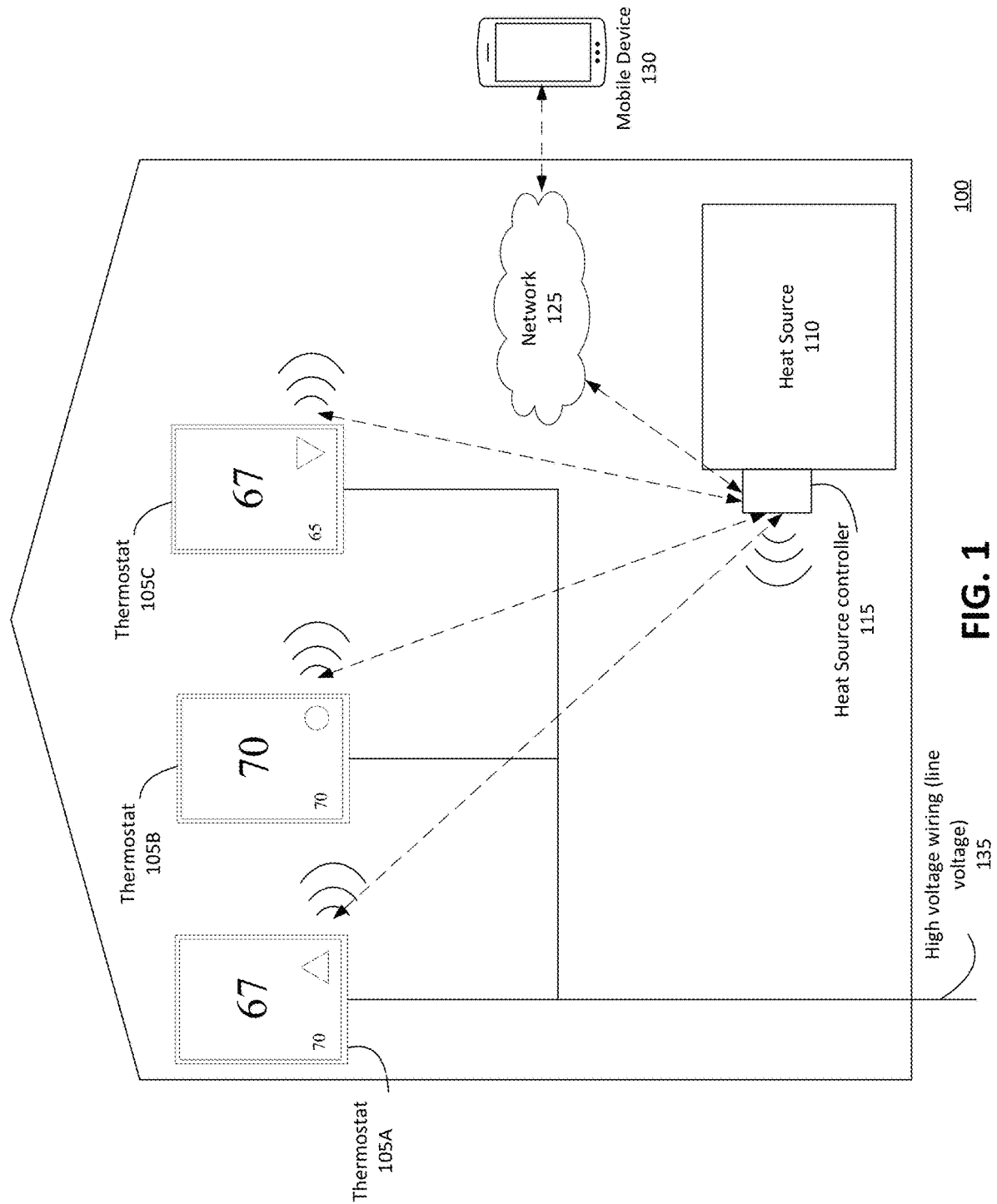
FIG. 1 illustrates a high level diagram of a house using wireless thermostats powered by line voltage, in accordance with some embodiments.

FIG. 1 illustrates a high level diagram of a house using wireless thermostats powered by line voltage, in accordance with some embodiments. As illustrated in FIG. 1, the house 100 may comprise multiple thermostats 105 (e.g., thermostats 105A, 105B, and 105C). Each of the thermostats 105 may correspond to a room or zone of the house 100, hereinafter collectively referred to as "rooms," although it is understood that in some cases a zone of the house can correspond to more than one room. For example, the thermostat 105A may be located in a living room of the house 100, while the thermostats 105B and 105C may be located within bedrooms of the house 100.

Each of the thermostats 105 comprises a temperature sensor configured to measure a temperature of the room that the thermostat corresponds to. By comparing the measured temperature with a desired temperature (e.g., as set by a user or in accordance with a predefined schedule), the thermostat 105 may determine whether heating or cooling of the room is needed. Each thermostat 105 has a display screen configured to display information to a user of the thermostat. For example, the display screen of a thermostat 105 may indicate a current temperature of the room corresponding to the thermostat, the desired temperature of the room, and a current status of the thermostat (e.g., whether or not it is currently instructing a heat source to heat the room).

Each thermostat 105 further comprises at least one user interface element (e.g., one or more buttons, a dial, a touchscreen, or some combination thereof) allowing a user to interact with the thermostat 105. For example, a user may be able to set a temperature for a room of the house 100 using the corresponding thermostat 105, configure a heating schedule for a particular thermostat 105, and/or the like. Through the use multiple thermostats corresponding to different rooms of the house, the temperature for the different rooms can be controlled independently. For example, the temperature for each room may be controlled using radiant floor heating, baseboard heating, separate heating/cooling vents, and/or the like.

The house 100 contains a heat source 110 usable to change the temperature of the interior of the house. As used herein, a heat source (e.g., the heat source 110) may refer to a heating source, a cooling source, or a combination thereof. As such, the heat source 110 may, in some embodiments, may be used to heat or cool different areas of the house 100. For ease of description, the heat source is hereinafter referred to as heating a room, although this may in some embodiments also include cooling the room.

In some embodiments, the house 100 has a single heat source 110. Heat from the heat source 110 may be directed through a plurality of manifolds (not shown) corresponding to different rooms of the house, allowing for each room to be heated differently. In some embodiments, the house 100 may have several heat sources 110, each configured to heat a subset of rooms within the house.

The heat source 110 is connected to a heat source controller 115 configured to control operations of the heat source 110 (e.g., turn the heat source on or off) based upon instructions received from the thermostats 105. In addition, in some embodiments, the heat source controller 115 further functions as a manifold controller to control a plurality of manifolds to direct heat from the heat source 110 to different rooms of the house 100 corresponding to different thermostats 105. As such, the heat source controller 115 can control the heat source 110 to heat each of the different rooms of the house 100 differently based upon instructions received from the thermostats 105. In some embodiments, the heat source controller 115 is directly connected to the heat source 110, or is connected to the heat source 110 via a wired connection.

The thermostats 105 communicate(s) wirelessly with the heat source controller 115. In some embodiments, the thermostats 105 each communicate with the heat source controller 115 directly via an RF (radio frequency) signal, which may be a LoRa (Long Range) wireless signal, and/or the like. This allows for a single heat source controller 115 to communicate with multiple thermostats 105 that may be scattered over different locations within the house 100. Each thermostat 105 may send instructions to the heat source controller 115 indicating whether heat should be directed to the corresponding room of the house 100. In response, the heat source controller 115 may turn the heat source 110 on or off, and/or control the manifolds corresponding to each room, such that heat from the heat source 110 is directed to the appropriate rooms.

In some embodiments, the heat source controller 115 may further connect to a network 125 (e.g., the Internet) to communicate with a mobile device 130. The connection of the heat source controller 115 to the network 125 may be via a wired connection (e.g., Ethernet connection) or a wireless connection (e.g., WiFi). The mobile device 130 may comprise any type of computing device, such as a mobile phone, tablet, laptop computer, or other type of computing device capable of interacting with the heat source controller 115 through the network 125. In some embodiments, the mobile device 130 includes an application usable by a user of the mobile device 130 to interact with the heat source controller 115 and/or the thermostats 105. For example, a user at the mobile device 130 may utilize an application installed on the mobile device 130 to send instructions to the heat source controller 115 or to one or more of the thermostats 105 via the heat source controller 115.

As illustrated in FIG. 1, each of the thermostats 105 is powered by line voltage wiring 135 routed within the house 100. Because the thermostats 105 are powered by the existing line voltage wiring (e.g., 120 volts AC wiring) of the house 100, the thermostats 105 require less work to install in comparison to thermostats that require special low-voltage wiring (e.g., 24 V wire) to be routed through the house, especially if the house is to contain multiple thermostats. As such, instead of requiring a new set of wiring throughout the house 100, each thermostat 105 may be connected to the line wiring of the house 100 by extending an additional length of line wire from an existing fixture of the house, such as a power outlet or a light switch. For example, in some embodiments, a thermostat 105 may be installed above a light switch in a room, thus requiring only a small amount of additional wiring (e.g., corresponding to the distance between the thermostat and the light switch) to connect the thermostat to the existing line wiring of the house. In addition, in comparison to thermostats that are powered by battery, powering the thermostats 105 using line voltage eliminates the need for users to have to monitor a current charge level of the battery and to regularly change the battery.

While FIG. 1 illustrates certain configurations between the illustrated components within the environment, it is understood that in some embodiments, alternate configurations may be available. For example, in some embodiments, the house 100 may contain multiple heat sources 110, wherein each thermostat 105 is in communication with a heat source controller 115 corresponding to one of the multiple heat sources 110. In some embodiments, a thermostat 105 may comprise a WiFi connection module able to communicate directly with the mobile device 130 through the network 125, instead of communications between the mobile device 130 and thermostat needing to be routed through the heat source controller 115 as illustrated in FIG. 1.

Line Voltage Thermostat with Separate High and Low Voltage Portions

Many electronic components within the thermostat, such as the display, temperature sensor, wireless communication module, etc., may be designed to run on a voltage that is lower than the line voltage of the house. For example, while the line voltage of the house may be 120 volts AC, the thermostat components may be configured to run on a low voltage such as 5 volts DC, 24 volts DC, or similar. As such, previous thermostats have often required the appropriate lower voltage wiring to be wound through the house to provide power to the components of the thermostat.

In accordance with the embodiments described herein, the thermostat is configured to receive line voltage power. To power the components of the thermostat, the high voltage power received through the line voltage wiring needs to be converted to the appropriate lower voltage level. However, the conversion of high power (e.g., 120 volts AC) to a low voltage (e.g., 5 volts DC) will typically generate a large amount of heat, which is why conventional thermostats are configured to operate at low voltage. In addition, low voltage is typically used for safety reasons (e.g., to prevent a user of the thermostat from receiving an electric shock when handling the thermostat) To prevent the heat generated by the power conversion circuitry from skewing readings of the temperature sensor of the thermostat and/or damaging other components within the thermostat, the thermostat has a structure that is divided into separate high voltage and low voltage portions.

Figure 2A:
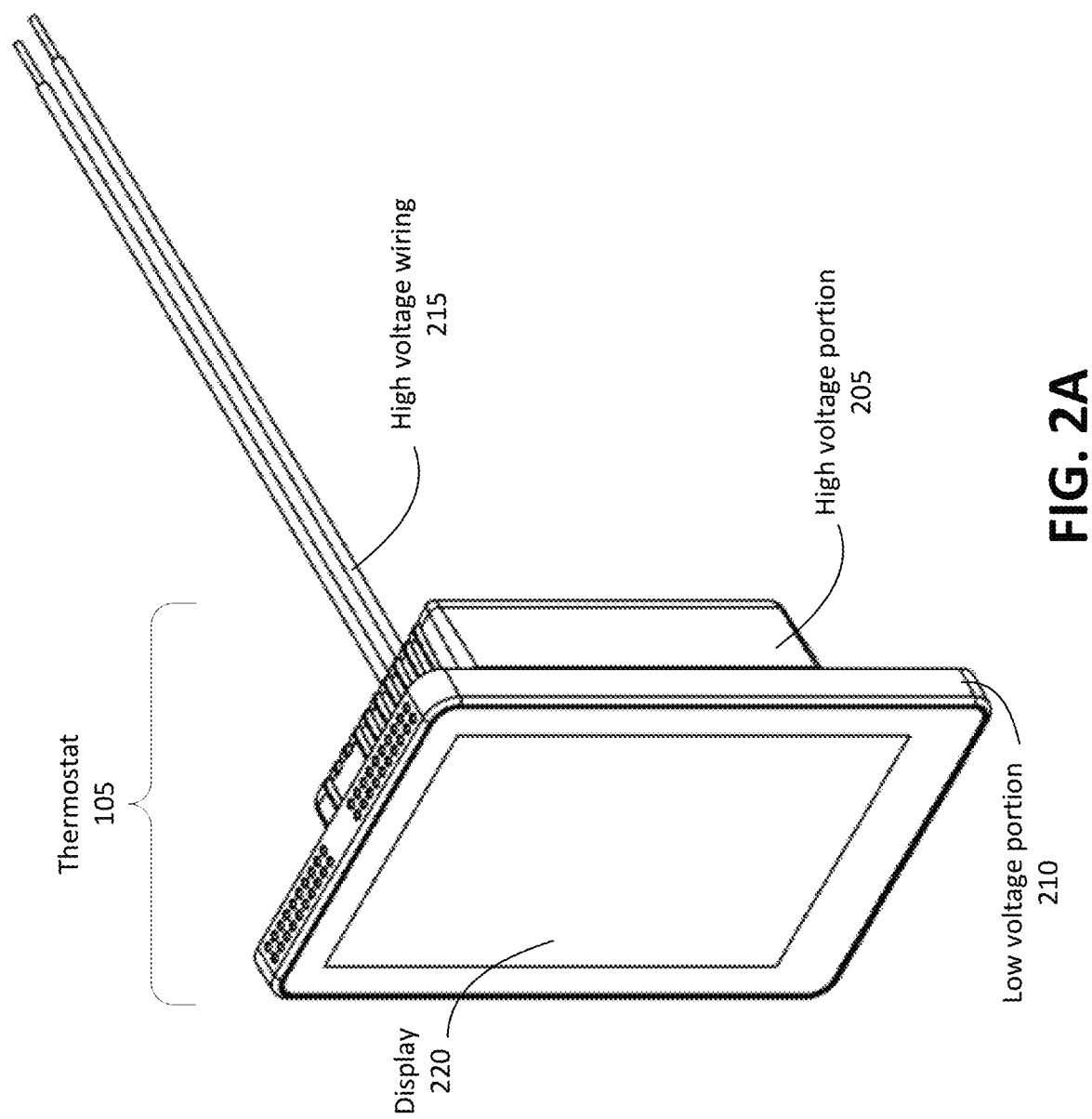
FIGS. 2A-2C illustrate views of a line voltage powered thermostat capable of wireless communication, in accordance with some embodiments.
Figure 2B:
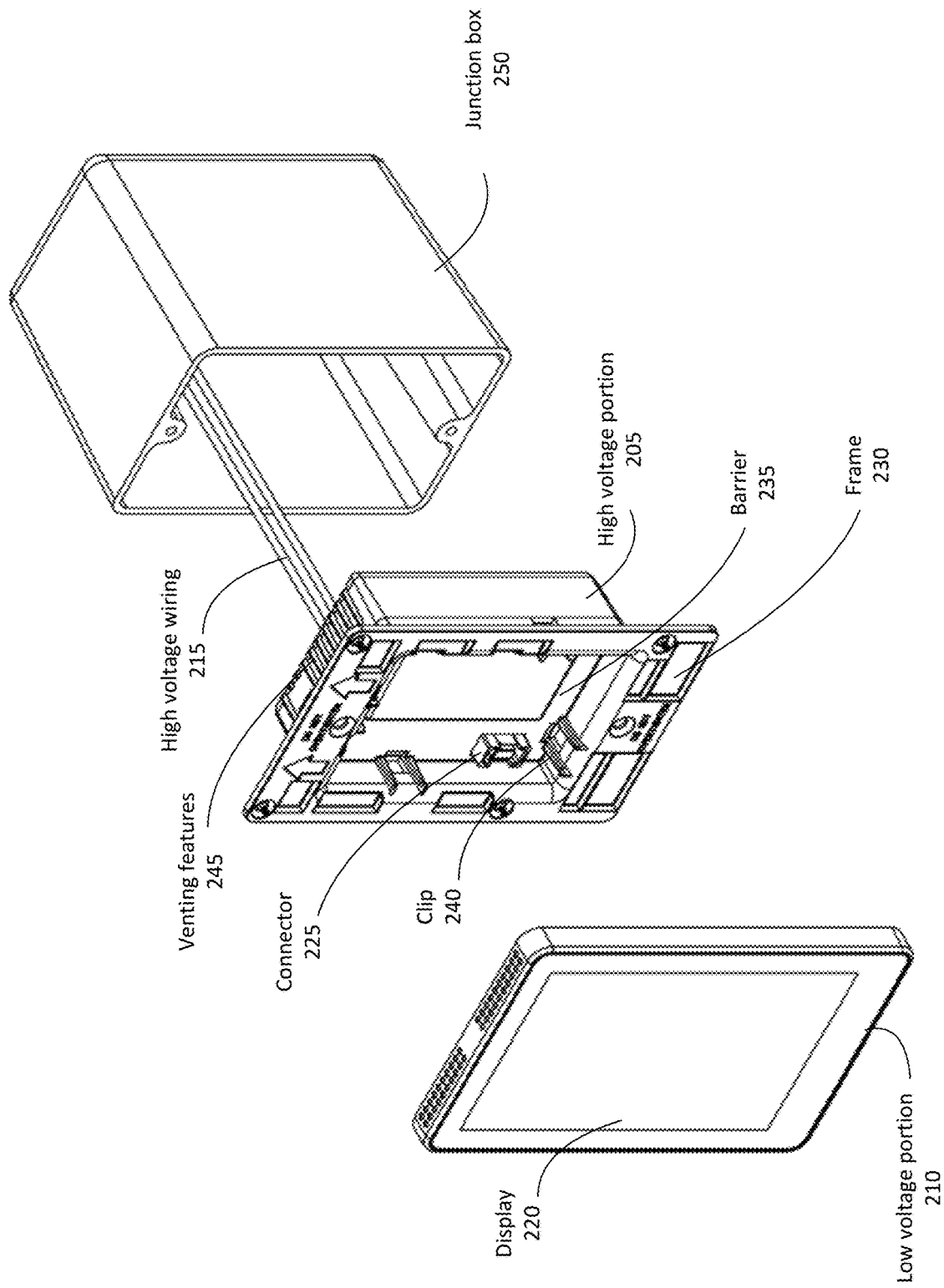
Figure 2C:
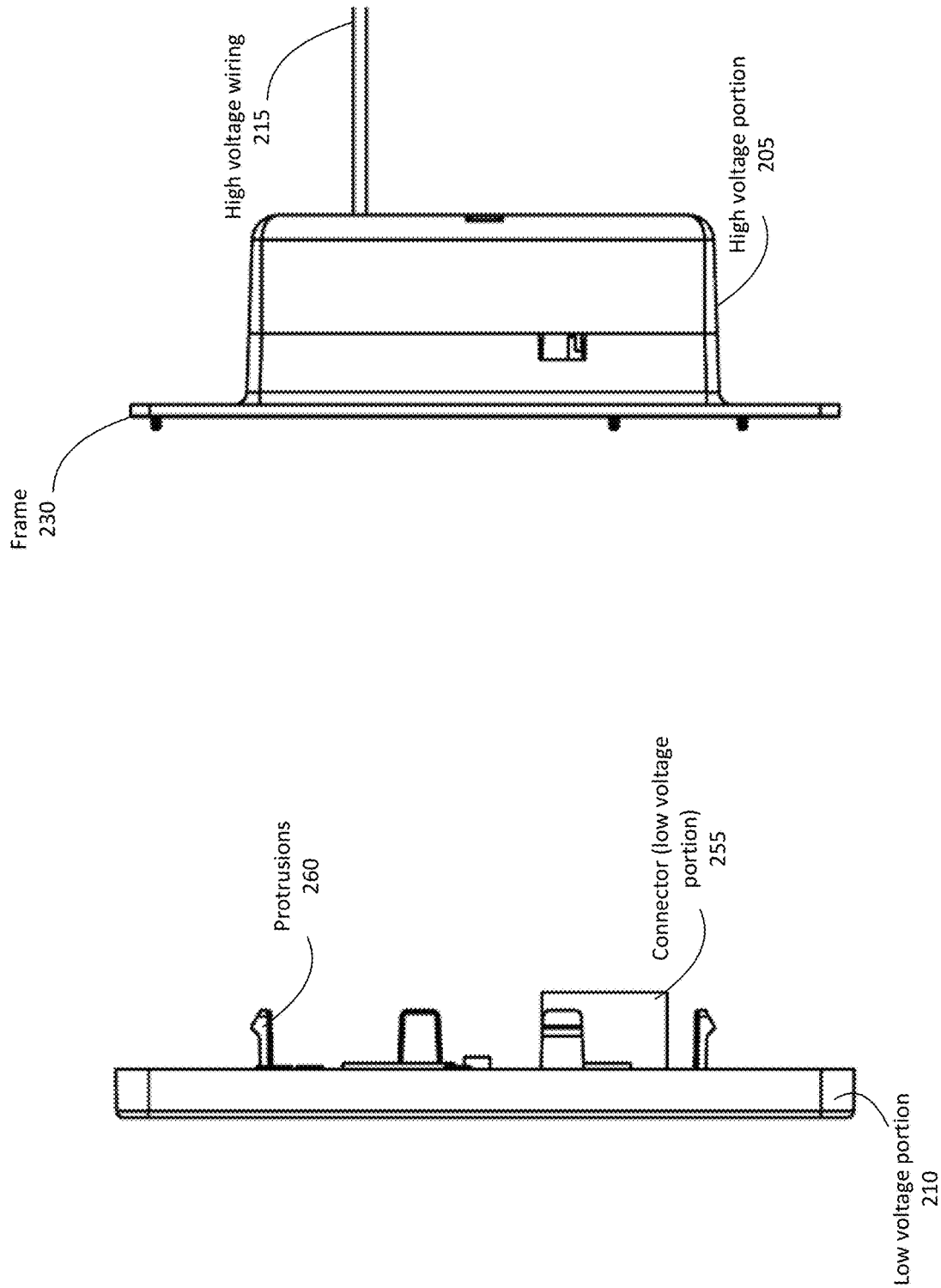

FIGS. 2A-2C illustrate views of a line voltage powered thermostat capable of wireless communication, in accordance with some embodiments. FIG. 2A illustrates a perspective view of the thermostat, while FIG. 2B illustrates an exploded view of the thermostat, and FIG. 2C illustrates a side view of the high and low voltage portions of the thermostat. As illustrated in FIGS. 2A-2C, the thermostat 105 comprises a high voltage portion 205, and a low voltage portion 210. By separating the thermostat 105 into separate high voltage and low voltage portions 205 and 210, the thermostat 105 can be powered by line voltage while isolating essential electronic components from the high line voltage, as well as from heat generated through the conversion of the line voltage to a lower voltage. In addition, the separate portions of the thermostat may allow a user to more easily swap out portions of the thermostat (e.g., for diagnostic, repair, or upgrade purposes).

In some embodiments, the thermostat 105 is mounted within the wall of a house using a junction box (J-box) 250 (illustrated in FIG. 2B). For example, the high voltage portion 205 may have alignment features, such as one or more mounting holes, that allow for the high voltage portion 205 to be aligned with and secured to the J-box 250, such that the body of the high voltage portion 205 is within the interior of the J-box 250. When mounted within the wall, the outer surface of the high voltage portion 205 may be positioned to substantially align with the surface of the wall (e.g., flush with the wall surface). The low voltage portion 210 can be placed over the high voltage portion, such that an inner surface of the low voltage portion 210 is substantially flush with the surface of the wall. As such, the high voltage portion 205 may reside within the wall of the house (e.g., inside the J-box 250), with only the low voltage portion 210 protruding from the wall.

The low voltage portion 210 has a display 220 configured to display temperature and status information to the user. For example, the display 220 may display a current temperature of the room (as measured by a temperature sensor within the low voltage portion 205), a current desired temperature, an indication of a status of the heat source 110 (e.g., whether the heat source 110 is currently providing heat to the room), and/or the like. In some embodiments, the display 220 is a touchscreen, allowing a user of the thermostat 105 to interact with the thermostat 105 and issue commands to the thermostat 105. In other embodiments, the thermostat 105 has one or more other types of input elements (not shown), such as one or more buttons, knobs, etc.

The high voltage portion 205 of the thermostat 105 is connected to high voltage wiring 215, which may correspond to the line voltage wiring of the house (e.g., 120 or 240 volts AC, or other voltage level that may be unsafe for general access by an occupant of a structure but may be utilized in the power grid of a structure). The high voltage portion 205 receives high voltage power provided by the high voltage wiring 215, and converts the high voltage power into power of a lower voltage (e.g., 5 or 24 volts DC, or other voltage level that may be safe to be accessed by the occupants of the structure), hereinafter referred to as "low voltage power." In addition, the high voltage portion 205 may convert the high voltage power from AC power to DC power. As used herein, "low voltage" or "low voltage level" may refer to a voltage level at which there is a low risk of electric shock to a human, while "high voltage" or "high voltage level" may refer to a voltage level at which there is a high risk of electric shock to a human. For example, in some embodiments, low voltage power may refer to power having a voltage level of 40 volts or below, while high voltage power may refer to power having a voltage level of above 40 volts.

The high voltage portion 205 transmits the converted low voltage power to the low voltage portion via a connector 225. As such, the components of the low voltage portion 210 (e.g., the display 220, a temperature sensor, a wireless communication module, etc.) can be operated using the provided low voltage power.

As discussed above, the conversion of high voltage power from the high voltage line wiring to the low voltage power within the high voltage portion 205 may create a significant amount of heat. Without thermally insulating the high voltage portion 205 from the low voltage portion 210, this heat may adversely affect the readings of the temperature sensor within the low voltage portion 210, potentially affecting the ability of the temperature sensor to accurately assess the temperature of the room in which the thermostat is installed. To prevent the heat generated through power conversion within the high voltage portion 205 from adversely affecting the components of the low power portion 210, the electrical components of the high voltage portion 205 may be contained within a frame 230 having a barrier 235, that functions dielectrically and thermally to insulate the high and low voltage portions from each other. In some embodiments, the frame 230 is formed from injection molded plastic.

The barrier 235 comprises a material suitable for dielectric and thermodynamic insulation. For example, in some embodiments, the barrier 235 may comprise a polymer material having good dielectric and temperature resistant (e.g., fire resistive) properties. In some embodiments, the material of the barrier 235 has a resistivity of $10^{16}$ Ω·m or greater, in order to function effectively as an electrical insulator.

The barrier 235 may be in the form of a sheet with an opening allowing for the connector 225 to pass through the barrier 235 to connect the high voltage portion 205 to the low voltage portion 210. The barrier 235 may be a separate component inserted into the frame 230, or may be an integral part of the frame 230.

By providing the barrier 235 between the high voltage portion 205 and low voltage portion 210, heat flow from the high voltage portion 205 to the low voltage portion 210 can be greatly reduced, allowing for the temperature sensor of the low voltage portion 210 to more accurately measure an interior temperature of the room. Instead, the heat generated by the high voltage portion 205 may be dissipated through one or more venting features 245 of the frame 230 to an interior of the wall of the house. In some embodiments, the J-box 250, which may enclose the high voltage portion 205, may also have one or more venting features to enable dissipation of heat from the high voltage portion 205 into the interior of the wall.

In some embodiments, the low voltage portion 210 is detachable from the high voltage portion 205. For example, the low voltage portion 210 may have one or more protrusions 260 that align with one or more clips 240 on a surface of the high voltage portion 205. The protrusions and clips are aligned such that when the protrusions of the low voltage portion 210 are inserted into the clips of the high voltage portion 205, the connector 255 of the low voltage portion 210 will be electrically connected to the connector 225 of the high voltage portion 205. In some embodiments, the protrusions 260 and clips 240 connect with a snap-on interface, allowing for the user to manually attach and detach the low voltage portion 210 from the high voltage portion 205 via pushing or pulling, without the need for special tools or expertise. In other embodiments, the low voltage portion 210 may have a button or other mechanical feature that enables the low voltage portion 210 to be attached to or detached from the high voltage portion 205. On the other hand, the high voltage portion 205 may be affixed to the J-box 250 using a screw or other mounting device that would require a tool to be removed, preventing the user from removing the barrier 235 from the high voltage portion, and maintaining the high voltage components of the high voltage portion 205 in a location that is inaccessible to the user.

Being able to detach the low voltage portion 210 from the high voltage portion 205 of the thermostat 105 allows for a user to be able to swap out different low voltage portions 210 of the thermostat 105. For example, the low voltage portion 210 of the thermostat 105 may contain memory and processing elements having settings associated with a room of the house 100, such as temperature schedule settings, personalization settings, and/or the like. On the other hand, the high voltage portions 205 of the thermostats 105 may all be identical in function, and are fixed to the wall of the house (e.g., within the J-box 250). As such, if the wrong low voltage portion 210 is attached to the high voltage portion 205 in a particular room, the low voltage portion 210 can be easily removed, and the correct one swapped in. In addition, the low voltage portion 210 may also be removed for ease of repair or upgrading of components, or for other purposes.

Because the high voltage power provided by the line voltage wiring 215 is converted to low voltage power within the high voltage portion 205 of the thermostat 105, the low voltage portion 210 receives only low voltage power (e.g., through the connector 225). As such, the low voltage portion 210 can be more safely handled by a user without the need to take special precautions, due to the lack of any high voltage power in the components of the low voltage portion 210. Furthermore, the presence of the barrier 235 between the high and low voltage portions may serve to further protect the user from coming into contact with any high voltage components of the thermostat.

High Voltage Portion and Frame

Figure 3:
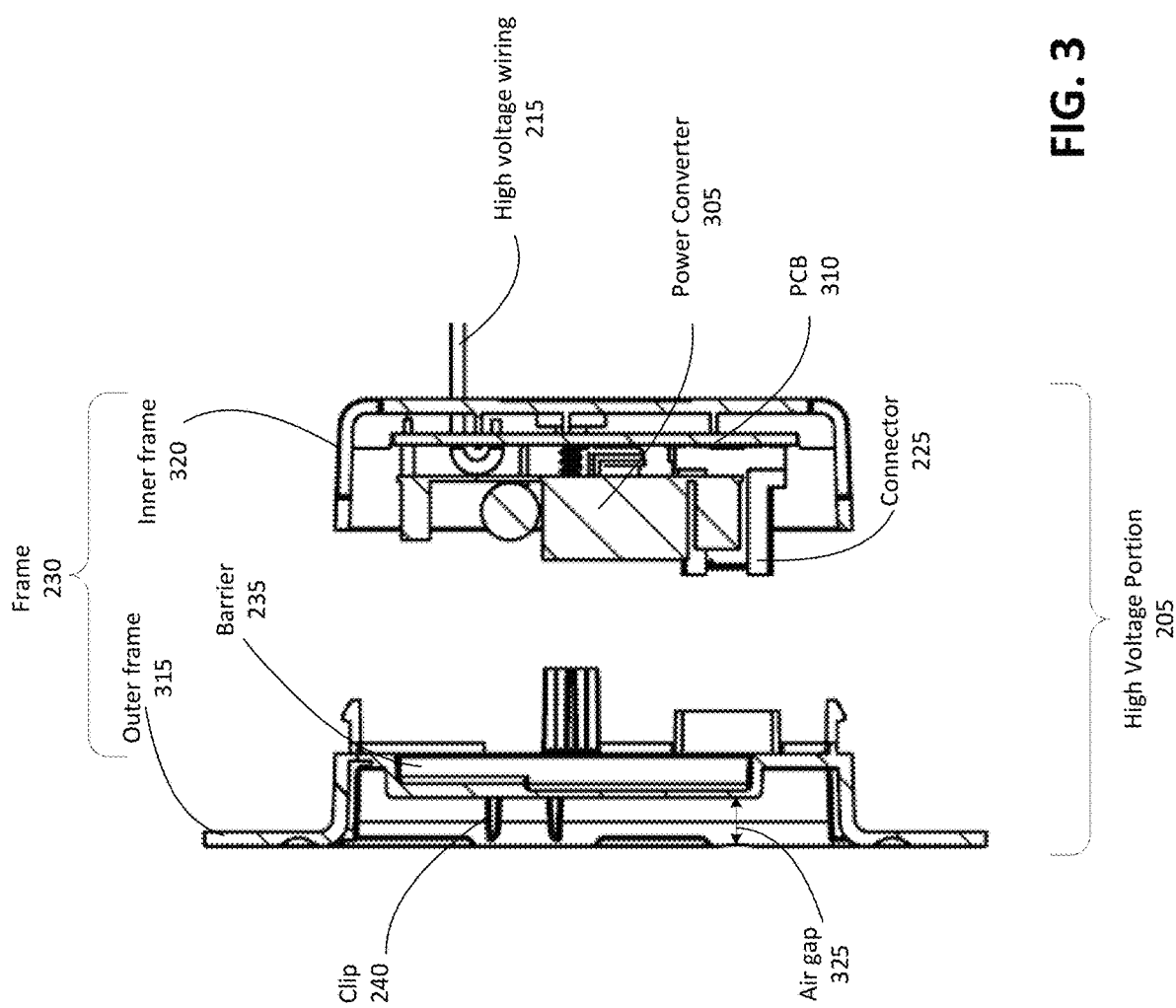
FIG. 3 illustrates a side cross-sectional view of the high voltage portion 205 of the thermostat 105, in accordance with some embodiments.

FIG. 3 illustrates a side cross-sectional view of the high voltage portion 205 of the thermostat 105, in accordance with some embodiments. As illustrated in FIG. 3, the high voltage portion 205 of the thermostat 105 may include one or more electrical components (e.g., a power converter 305) mounted on a circuit board (e.g., PCB 310). The PCB 310 is enclosed within the frame 230, which may be divided into an inner frame 320 and an outer frame 315. For example, the PCB 310 may be placed within the inner frame 320, whereupon the outer frame 315 can be attached to the inner frame 320 to enclose the PCB 310.

As used herein, "inner" may refer to a surface or component that is further away from the outer surface of the wall that the thermostat 105 is installed in, while "outer" may refer to a surface or component that is closer to the outer surface of the wall. For example, the outer frame 315 may, when the thermostat 105 is assembled, may directly abut the low voltage portion 210 of the thermostat 105.

In some embodiments, the barrier 235 is a separate component of dielectric and thermodynamically insulating material that is attached to the frame 230. For example, as illustrated in FIG. 3, an inner surface of the outer frame 315 may have an indentation or other alignment features, allowing for the barrier 235 to be placed within the outer frame 315, such that when the inner and outer frames are assembled together, the barrier 235 will be positioned between the power converter 305 and PCB 310 of the high voltage portion 205 and the low voltage portion 210. When the barrier 235 is in place, the connector 225 (which receives low voltage power) is the only electronic component of the high voltage portion 205 that is exposed through the barrier 235. As such, a user, when installing or removing the low voltage portion 210 from the high voltage portion 205, can be prevented from touching any high voltage components of the high voltage portion 205.

In some embodiments, the outer frame 315 is shaped to define an air gap between the barrier 235 and the outer surface of the outer frame 315. The air gap 325 may provide additional thermal isolation of the low voltage portion 210 from heat generated by the power converter 305 of the high voltage portion 205. In addition, the air gap 325 may be sized to accommodate one or more alignment features (e.g., clip 240 for attaching the low voltage portion 210 to the outer frame 315), as well as one or more protruding components of the low voltage portion 210 such as the connector 255 of the low voltage portion configured to mate with the connector 225 of the high voltage portion 205, thus enabling flow of low voltage power to the low voltage portion 210.

Thermostat Components

Figure 4:
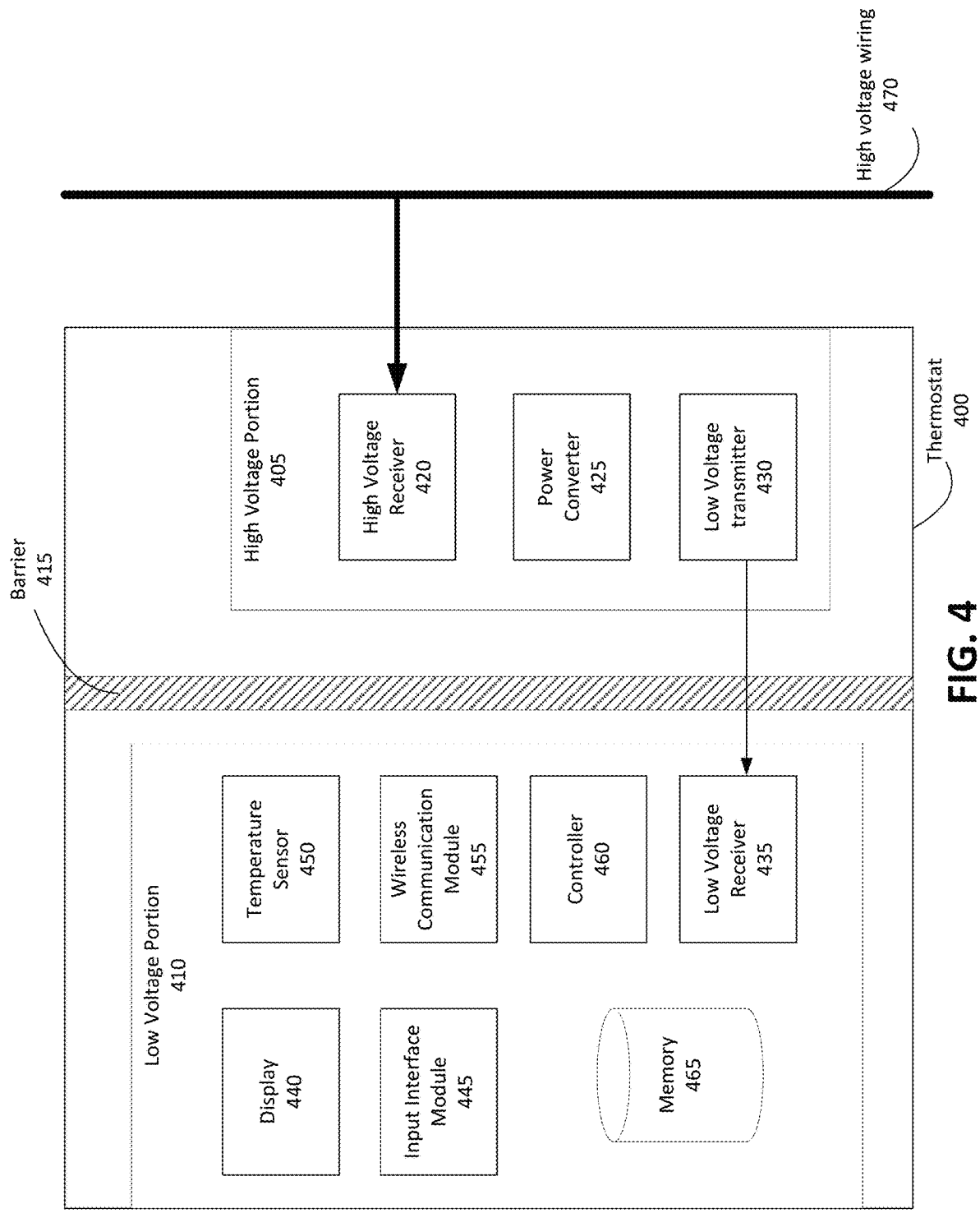
FIG. 4 illustrates a high level block diagram of a line voltage powered thermostat capable of wireless communication, in accordance with some embodiments.

FIG. 4 illustrates a high level block diagram of a line voltage powered thermostat capable of wireless communication, in accordance with some embodiments. The thermostat 400 may correspond to the thermostat 105 illustrated in FIGS. 1-3.

The high voltage portion 405 of the thermostat 400 comprises a high voltage receiver 420, a power converter 425, and a low voltage transmitter 430. The high voltage receiver 420 is connected to the line voltage wiring 470 of the house, from which high voltage power (e.g., 120 volts AC) is received. The power converter 425 is configured to receive the voltage power from the high voltage receiver 405, and to convert the high voltage power into power of the lower voltage (e.g., 5 volts DC). In addition, the power converter 425 may convert the received power from AC power to DC power. The low voltage transmitter 430 receives the converted low voltage power from the power converter 425, and transmits the low voltage power to the low voltage portion 410. In some embodiments, the low power transmitter 430 is implemented as part of a connector (e.g., the connector 225 illustrated in FIG. 2B) that passes through an opening in the barrier 415 and is configured to interface with a corresponding connector (e.g., the connector 255 illustrated in FIG. 2C) of the low voltage portion 410, allowing for low voltage power to be transmitted from the low power transmitter 430 of the high voltage portion 405 to the low voltage receiver 435 of the low voltage portion 410.

The barrier 415 comprises a sheet of dielectrically and thermally insulating material, such as fire resistive polymer, situated between the high voltage portion 405 and the low voltage portion 410. As such, dissipation of heat generated by the power converter 425 of the high voltage portion 405 to the components of the low voltage portion 410 is inhibited, and prevented from adversely affecting the components of the low voltage portion 410, such as the temperature sensor 450. The barrier 415 comprises an opening configured to allow a connector to pass through the barrier 415 to enable transmission of low voltage power between the high voltage portion 405 and the low voltage portion 410.

The low voltage portion 410 comprises electronic components that may include a display 440, an input interface module 445, a temperature sensor 450, a wireless communication module 455, a controller 460, and memory 465. The components of the low voltage portion 410 may be powered by low voltage power received from the high voltage portion 405 via the low voltage receiver 435. For example, the low voltage receiver 435 may be implemented as part of a connector configured to connect with a corresponding connector of the high voltage portion 405.

The display 440 may correspond to a display screen (e.g., a flat panel display such as an LED display) for displaying information to a user of the thermostat 400. The displayed information may comprise a current sensed temperature of the room (as determined by the temperature sensor), a desired set temperature (e.g., as set by a user, or in accordance with one or more settings), and an operational status of the thermostat 400 (e.g., whether the thermostat is currently instructing the heat source controller to turn the heat source on or off). In some embodiments, the display 440 may further display a current time, one or more messages or notifications, content or images associated with the thermostat (e.g., corresponding to the room the thermostat is in, a user associated with the thermostat, etc.).

The input interface module 445 is configured to receive and process one or more user inputs received through one or more interface elements. The interface elements may comprise a touchscreen (e.g., implemented as part of the display 440), one or more buttons or dials, etc. In some embodiments, the user may use the interface elements to control how information is displayed on the display 440, set a desired temperature, create or edit a heating schedule, and/or the like.

The temperature sensor 450 is configured to measure a temperature of the local area around the thermostat. In some embodiments, the temperature sensor 450 is exposed to the air in the room via one or more vents formed on the low voltage portion 410, allowing the temperature sensor 450 to accurately measure a temperature of the room in which the thermostat is installed. Because the barrier 415 inhibits heat produced by power converter 425 in the high voltage portion 405 from reaching the low voltage portion 410, the ability of the temperature sensor to accurately measure the local area temperature is improved, due to not being adversely affected by generated heat.

The wireless communication module 455 is configured to communicate wirelessly with a heat source controller (e.g., the heat source controller 115 illustrated in FIG. 1). In some embodiments, the wireless communication module 455 communicates with the heat source controller directly using RF signals, LoRa signal, and/or the like. For example, the wireless communication module 455 may be used to send instructions to the heat source controller indicating whether or not to heat the room that the thermostat is located in (e.g., turning on the heat source and directing the heat through one or more manifolds to reach the room). In some embodiments, the wireless communication module 455 may also receive instructions from the heat source controller (e.g., instructions from a user at a mobile device, which are routed to the thermostat via the heat source controller). For example, a user at a mobile device may install an application for controlling the thermostat, allowing the user to issue instructions to the thermostat (e.g., change a temperature setting or schedule, display a message or media content, update a current status, etc.) through the heat source controller. In some embodiments, the wireless communication module 455 may be further configured to connect wirelessly to the Internet (e.g., using Wi-Fi), from which it may receive instructions from the mobile device directly instead of through the heat source controller.

The controller 460 comprises one or more processors used to control operations of the thermostat 105. For example, the controller 460 may receive user inputs via the input interface module 445 or from the wireless communication module 455 (e.g., from a user at a mobile device), such as instructions from a user to change a temperature setting or schedule of the thermostat. In response, the controller may modify one or more thermostat settings (e.g., stored in the memory 465), cause the display 440 to display the updated settings, and/or issue appropriate instructions to the heat source controller via the wireless communication module 455.

The controller 460 receives temperature readings from the temperature sensor 450, and issues instructions to the heat source controller via the wireless communication module 455 based upon the received temperature readings. For example, the controller 460 may compare the received temperature reading with a current desired temperature, and instruct the heat source controller to control the heat source based upon a result of the comparison.

The memory 465 is configured to store data associated with the operation of the thermostat, and may correspond to any type of data source device, such as flash memory, SSD memory, RAM, or some combination thereof. For example, the memory 465 may store a current desired temperature, a temperature setting schedule, one or more display settings for the display 440 (e.g., color settings, background image, etc.), one or more messages (e.g., messages or notifications that can be displayed on the display 440), one or more media files (e.g., corresponding to content that can be displayed on the display 440), and/or the like.

As discussed above, the components of the low voltage portion 410 are all powered by low voltage power. As such, there will be no high voltage power flowing through the low voltage portion 410, making the low voltage portion 410 safer for a user to detach and handle. In addition, the low voltage portion 410 is thermally shielded by the barrier 415 from the high voltage portion 405, such that heat produced by the power converter 425 of the high voltage portion 405 when converting line voltage power to low voltage power does not adversely affect operation of the components of the low voltage portion 410. As such, the thermostat 400 can be powered by line voltage, making it easier to install, while also containing components powered by low voltage and being capable of wireless communication with a centralized heat source.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A thermostat assembly, comprising:
a first portion comprising:
 a power circuit configured to receive power via internal housing line voltage wiring at a first voltage level;
 a power conversion circuit configured to convert the power received via the line voltage wiring into power at a second voltage level lower than the line voltage;
 a first connector; and
a second portion, comprising:
 a second connector configured to removably connect to the first connector and receive power from the first portion at the second voltage level;
 a temperature sensor configured to measure an ambient temperature of an outside environment;
 a communication chip configured to communicate wirelessly with a primary heat source;
wherein the first and second portions are separated by a barrier located in a frame of the first portion, the barrier comprising a dielectric and thermodynamic insulator that inhibits dissipation of heat from the first portion to the second portion to reduce an effect of a temperature of the first portion on the temperature sensor, and is positioned to block access by a human user to any electrical components of the first portion that receive power at the line voltage level when the second portion is removed from the first portion.

2. The thermostat assembly of claim 1, wherein the first and second portions are configured to fit inside a junction box (J-box).

3. The thermostat assembly of claim 1, wherein the line voltage level is 120 vac.

4. The thermostat assembly of claim 1, wherein the second voltage level is 5 vdc.

5. The thermostat assembly of claim 1, wherein the communication chip is configured to communicate wirelessly with the primary heat source via RF communication.

6. The thermostat assembly of claim 1, wherein the barrier comprises a dielectric material or a plastic material.

7. The thermostat assembly of claim 1, wherein the second portion further comprises a display screen.

8. The thermostat assembly of claim 7, wherein the display screen comprises a touchscreen.

9. The thermostat assembly of claim 1, wherein the frame of the first portion is shaped to define an air gap between the barrier and an outer surface of the frame.

* * * * *